(12) United States Patent
Schanding

(10) Patent No.: US 6,449,665 B1
(45) Date of Patent: Sep. 10, 2002

(54) MEANS FOR REDUCING DIRECT MEMORY ACCESS

(75) Inventor: Angela Christopher Schanding, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/419,690

(22) Filed: Oct. 14, 1999

(51) Int. Cl.[7] .............................................. G06F 13/28
(52) U.S. Cl. ...................... 710/22; 710/308; 711/154; 711/213; 711/217
(58) Field of Search .............................. 710/22, 23, 26, 710/308; 711/154, 213, 217

(56) References Cited

U.S. PATENT DOCUMENTS

| | | |
|---|---|---|
| 4,912,632 A | 3/1990 | Gach et al. |
| 5,077,664 A | 12/1991 | Taniai et al. |
| 5,212,795 A | 5/1993 | Hendry |
| 5,287,471 A | 2/1994 | Katayose et al. |
| 5,487,138 A | 1/1996 | Rust et al. |
| 5,579,453 A | 11/1996 | Lindenfelser et al. |
| 5,655,151 A | 8/1997 | Bowes et al. |
| 5,696,989 A | 12/1997 | Miura et al. |
| 5,765,022 A | 6/1998 | Kaiser et al. |
| 5,797,033 A | 8/1998 | Ecclesine |
| 5,805,778 A | 9/1998 | Suzuki |
| 5,828,856 A | 10/1998 | Bowes et al. |
| 5,828,901 A | 10/1998 | O'Toole et al. |
| 5,829,054 A * | 10/1998 | Ehlig et al. ................... 710/22 |
| 5,835,788 A | 11/1998 | Blumer et al. |
| 5,857,114 A | 1/1999 | Kim |
| 5,983,301 A * | 11/1999 | Baker et al. ................. 710/113 |
| 6,006,286 A * | 12/1999 | Baker et al. ................... 710/22 |
| 6,081,852 A * | 6/2000 | Baker .......................... 710/10 |

* cited by examiner

*Primary Examiner*—Matthew Kim
*Assistant Examiner*—Christian P. Chace
(74) *Attorney, Agent, or Firm*—Needle & Rosenberg, P.C.; Jacqueline M. Daspit

(57) ABSTRACT

In a method of reducing direct memory access in a machine employing a data segmenting scheme, transfer of a repetitive block of data is detected. The repetitive block of data repeats a data word of a predetermined value. A first invalid address is assigned to a current address pointer. The first invalid address indicates that the repetitive block of data is to be generated. A second invalid address is assigned to an end segment pointer. The second invalid address corresponds to the first invalid address plus a value indicating a number of repetitive data words that is included in the block of repetitive data. While the current address pointer has a value assigned thereto that is not equal to the second invalid address, a data word of the predetermined value is generated and the value assigned to the current address pointer is stepped.

17 Claims, 6 Drawing Sheets

MEANS FOR REDUCING DIRECT MEMORY ACCESS

BACKGROUND OF THE INVENTION

1. Field of the Invention

This invention relates to direct memory access in a digital system, such as a printer. More particularly, this invention relates to a method of reducing direct memory access.

2. The Prior Art

Many existing computer printers, and other peripheral devices, access needed data by performing direct memory access of a memory space. Memory size and processor power are significant factors in the cost of electronic devices, such as ink jet printers. In video-type applications, much of the data stored in memory is white space. For example, in a tri-color ink jet cartridge, some nozzles may be restrained from firing at various times during printing to compensate for the physical layout of the print cartridge. This is typically accomplished by placing zeros in a corresponding memory location in a print buffer for these nozzles. Not only does this waste memory space by filling the print buffer with zeros, but it also decreases processor bandwidth as direct memory access from an application specific integrated circuit (ASIC) interrupts processor operations. Large blocks of other types of repetitive data, such as all ones or repetitive patterns of data, also give rise to significant overhead in terms of both buffer size and processor bandwidth.

Therefore, there exists a need for a digital device that, when transferring data from one memory location to another, is capable of detecting blocks of repetitive data and generating the repetitive data without requiring memory access.

SUMMARY OF THE INVENTION

In one embodiment, the invention is directed to a system for reducing direct memory access (DMA) for ink jet control by indicating to a DMA controller when a large sequence of zeros is to be written to the ink jet. By doing so, the system dedicates less memory to printer control, as the zeros need not be stored in memory. Furthermore, the system saves time and memory bandwidth because the controller does not have to access memory while writing a large sequence of zeros.

The system avoids DMA while writing zeros by using a DMA controller that uses three memory access pointers: (1) a current address pointer, which points to the address of the word that is just about to be accessed; (2) an end segment pointer, which points to the address of the last word of the segment currently being accessed; and (3) a next segment pointer, which points to the first word of the next segment to be accessed. If the address of the current address pointer is invalid (at least with respect to DMA addresses), then the DMA controller will automatically write a word of zeros to the printer.

When a long sequence of zeros is about to be printed, the DMA controller indicates a transition from non-zero data to zero data by writing the last non-zero valid address of the segment currently being accessed to the end segment pointer and by writing an invalid address to the next segment pointer. When the DMA controller begins generating words of zeros, it writes to the end segment pointer a value equal to the first invalid address corresponding to the beginning of the sequence of zeros plus the number of zero words to be written and writes to the next segment pointer a valid address corresponding to the next address containing non-zero data.

In one aspect the invention is a method of reducing direct memory access in a machine employing a data segmenting scheme. Transfer of a repetitive block of data is detected. The repetitive block of data repeats a data word of a predetermined value. A first invalid address is assigned to a current address pointer. The first invalid address indicates that the repetitive block of data is to be generated. A second invalid address is assigned to an end segment pointer. The second invalid address corresponds to the first invalid address plus a value indicating a number of repetitive data words that is included in the block of repetitive data. While the current address pointer has a value assigned thereto that is not equal to the second invalid address, a data word of the predetermined value is generated and the value assigned to the current address pointer is stepped.

In another aspect of the invention, if a repetitive block of data is to be transferred, then a first invalid address is assigned to a next segment pointer. The first invalid address indicates that the repetitive block of data is to be generated after a transfer of a first data segment is complete. If non-repetitive data is to be transferred, a first memory address of a second data segment is assigned to the next segment pointer. When transfer of the first data segment is complete, a value currently assigned to the next segment pointer is assigned to a current address pointer.

While the value assigned to current address pointer corresponds to a valid memory address, a value corresponding to a last memory address of a second data segment is assigned to an end segment pointer. While the value assigned to the current address pointer is not equal to the value assigned to the end segment pointer, a memory location addressed at the value assigned to the current address pointer is accessed, a data word stored in the memory location is fetched, and the value assigned to the current address pointer is stepped.

While the value assigned to current address pointer corresponds to an invalid memory address, a value corresponding to the value assigned to the current address pointer plus the predetermined number of repetitions is assigned to an end segment pointer. While the value assigned to the current address pointer is not equal to the value assigned to the end segment pointer a data word of a predetermined type is generated and the value assigned to the current address pointer is stepped.

In yet another aspect, the invention is a printer that includes a printer controller having a digital control circuit programmed to detect when a repetitive block of data is to be printed, wherein the repetitive block of data repeats a data word of a predetermined value. The control circuit assigns a first invalid address to a next segment pointer, the first invalid address indicating that the repetitive block of data is to be generated after a transfer of a current segment is complete; assigns a second invalid address to an end segment pointer, the second invalid address corresponding to the first invalid address plus a value indicating a number of repetitive data words that is included in the block of repetitive data; and assigns the first invalid address to a current address pointer. While the current address pointer has a value assigned thereto that is less than the second invalid address, the printer controller generates a data word of the predetermined value and steps the value assigned to the current pointer. The printer also includes a printer mechanism that receives the data word of the predetermined value from the printer controller and that executes a print operation corresponding to the data word of predetermined value.

These and other aspects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1A:
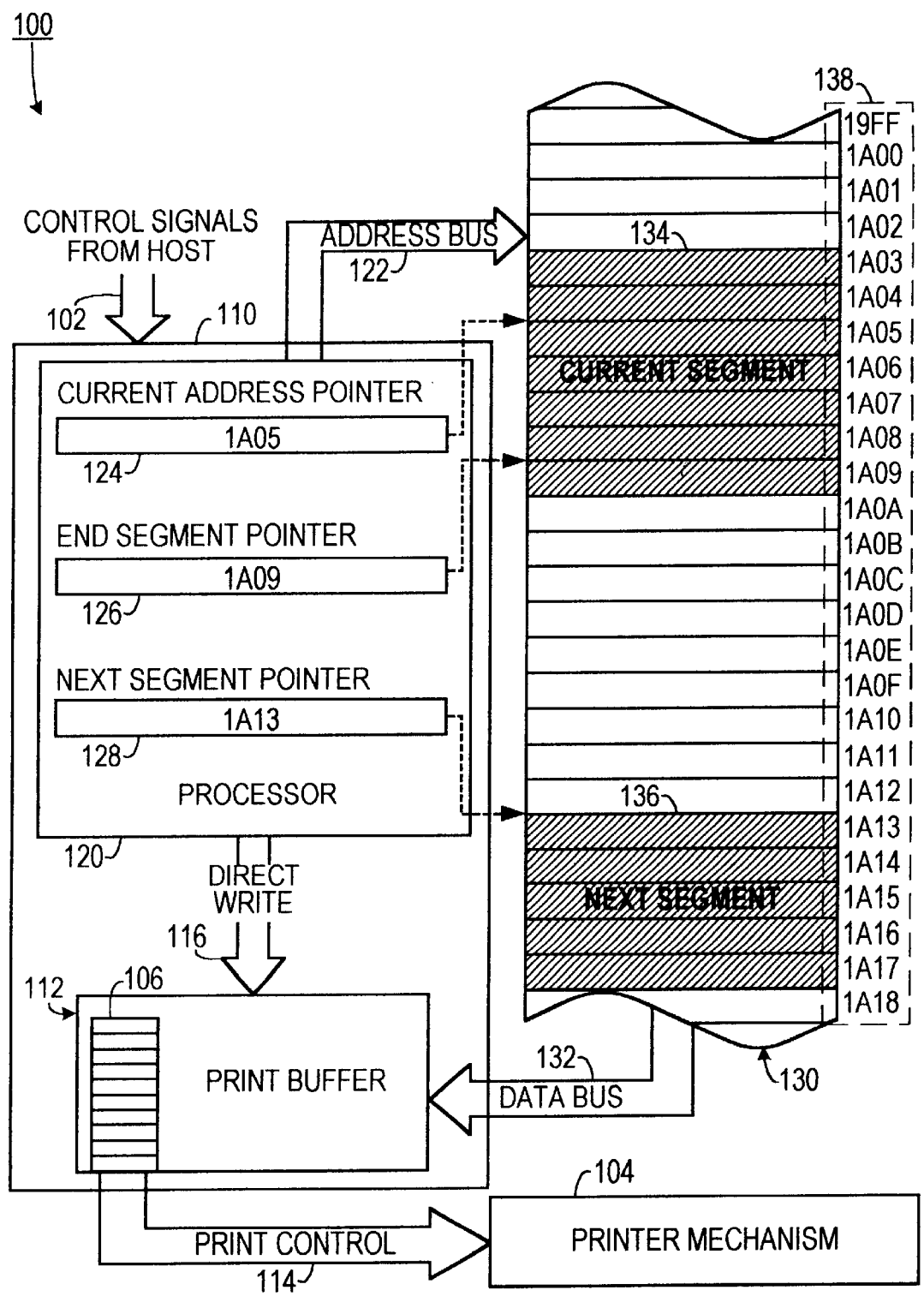
FIG. 1A is a schematic diagram of a printer employing one embodiment of the present invention.

A preferred embodiment of the invention is now described in detail. Referring to the drawings, like numbers indicate like parts throughout the views. As used herein, "stepping" means changing a pointer address by one or more units. Stepping may be accomplished by either incrementing or decrementing a value assigned to a pointer.

Figure 1B:
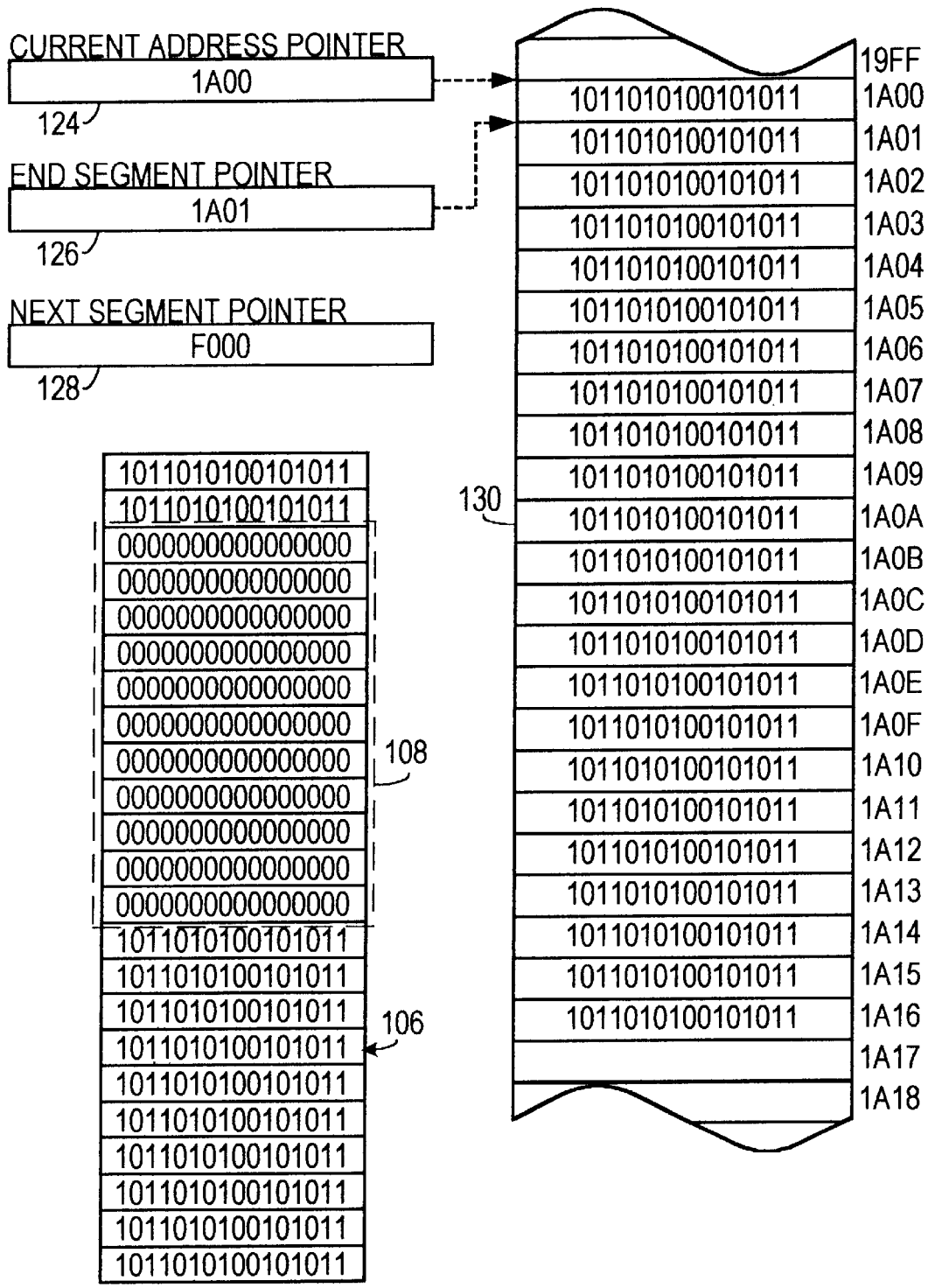
FIG. 1B is a schematic diagram demonstrating a transition to begin generating a block of zeros.
Figure 1C:
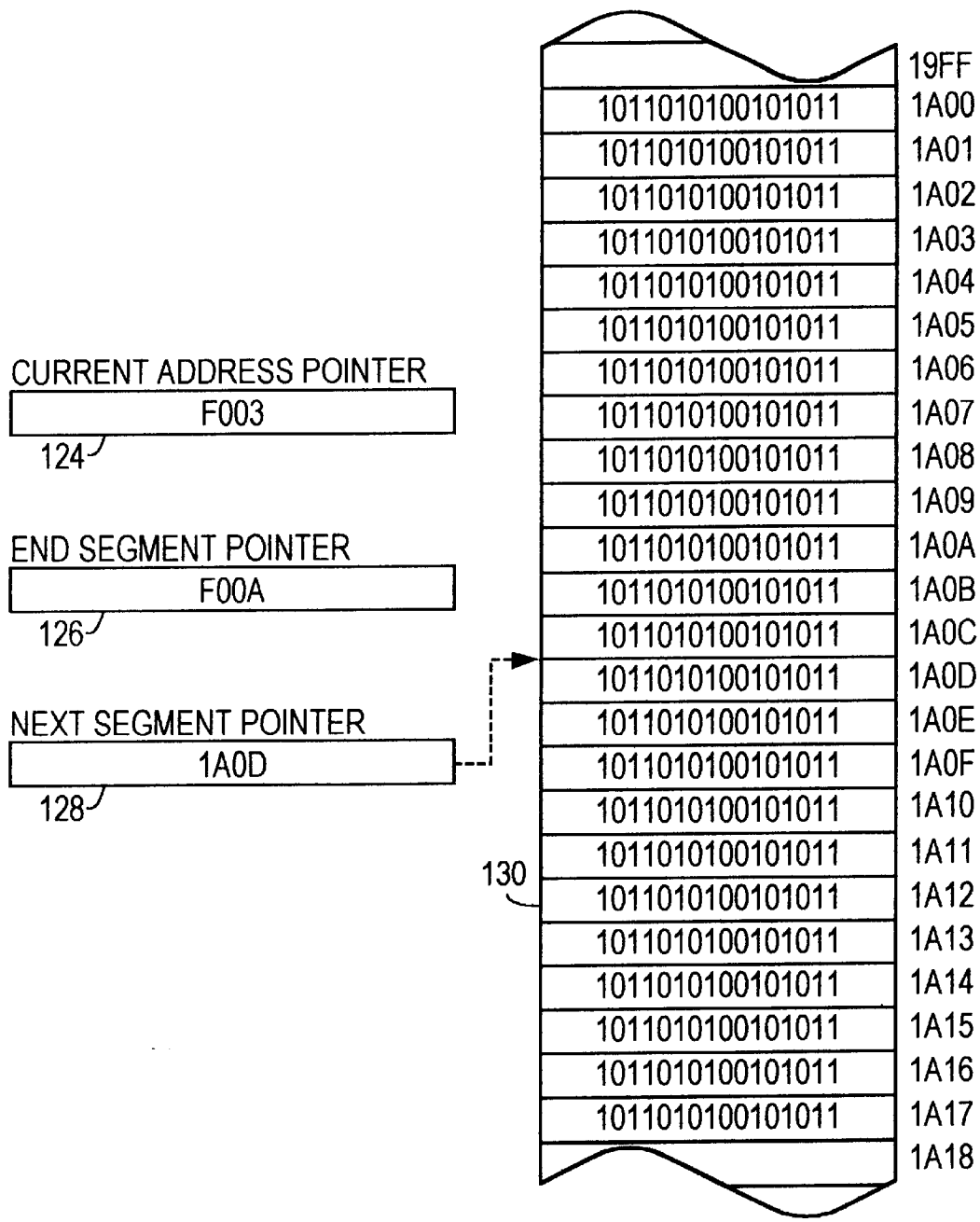
FIG. 1C is a schematic diagram demonstrating a transition to end generating a block of zeros.

One typical embodiment of the invention, shown in FIGS. 1A–1C, is a printer 100 that includes a printer controller 110, a printer memory space 130 that is addressed by a plurality of memory addresses 138 and a printer mechanism 104. Many different types of printer mechanism 104 could be employed without departing from the scope of the invention. These include an ink-jet mechanism, a laser printer mechanism, a dot matrix mechanism, or one of many other types of printer mechanism known to the art. The printer controller 110 receives printer specific data from a host computer, such as a personal computer, via a host data bus 102 and outputs control data to the printer mechanism 104 via a print control bus 114. Typically, such data would include, a plurality of ones and zeros, wherein a one indicates that a nozzle on a print head is to apply ink to a printed medium (e.g, paper) and a zero indicates that the nozzle is to refrain from applying ink.

The printer controller 110 includes a processor 120 and a printer buffer 112 that outputs data to a print control bus 114. In generating print instructions for non-repetitive data, the printer controller 110 receives printer specific instructions via the host data bus 102, accesses the memory space 130 by placing a memory address on an address bus 122 and receives data from the memory space 130 via a data bus 132. The data received is stored in the printer buffer 112 and is subsequently written to the print control bus 114 to cause the printer mechanism 104 to execute a print operation (e.g., to print a character).

The processor 120 maintains three pointers to facilitate the transfer of blocks of data from the memory space 130 to the print buffer 112. The current address pointer 124 points to the address of the next word in memory space 130 that is to be transferred to the print buffer 112. In the example shown, the current address pointer 124 points to address 1A05. This address will be placed on the address bus 122 during the next memory access, causing the contents of the memory word at address 1A05 to be placed on the data bus 132 and transferred to the print buffer 112. The end segment pointer 126 points to the address of the last word in the segment 134 currently being transferred. In the example shown, the end segment pointer 126 is pointing to address 1A09, the address of the last word of segment 134. The next segment pointer 128 points to the address of the first word of the next segment 136 to be printed after completion of the printing of the current segment 134.

In the context of printing non-repetitive data, when a new segment of memory is to be printed, the current value of the next segment pointer 128 is assigned to the current address pointer 124 and the end segment pointer 126 is assigned a value corresponding to the address of the last word of the new segment. This may be accomplished by adding the number of words to be printed to the value of the address for the first word of the new segment. The processor then sequentially accesses the data in the new segment by stepping the current address pointer until it reaches the value of the end segment pointer 126. In the example shown, the current address pointer 124 is stepped by incrementing the value stored therein. However, the memory management convention employed in a specific embodiment could allow for stepping by decrementing the value.

When a block of repetitive data is to be transferred to the print buffer 112 (such as when a margin is to be left blank on a page, resulting in a block of zeros being placed in the print buffer) the processor 120 performs a direct write 116 of the repetitive data to the print buffer 112 without performing a direct memory access. The print buffer 112 has a print memory structure 106 (e.g., a queue) that buffers the data to be written to the print control bus 114. As shown in FIG. 1B, when a blank area, such as a margin, is to be printed, it becomes necessary to fill a block 108 of the memory structure 106 with zeros. The processor 120 accomplishes the transition from writing non-repetitive data to writing a block of repetitive data (in this example a block 108 of zeros) by placing an invalid address in the next segment pointer 128. In the example shown, the addresses from 0000 through 9FFF could all be valid and every address from A000 through FFFF could be invalid. Thus, in the example shown, the invalid address placed in the next segment pointer 128 is F000. If all digits reserved for addresses of the memory space 130 correspond to valid addresses, then an extra digit would need to be added to each pointer to allow for invalid addresses.

Once the current address pointer 124 has been stepped so as to have a value equal to the end segment pointer 126, the invalid address in the next segment pointer 128 is written to the current address pointer 124. Then into the end segment pointer 126 is written a value equal to the invalid address plus the number of words in the block of repetitive data. The next segment pointer 128 is then assigned the value of the address of the first word of the next valid segment to be accessed from memory 130. FIG. 1C shows the values assigned to pointers 124, 126 and 128 after the processor 120 has begun generating a block of zeros, but before the last zero word of the block has been written.

Figure 2:
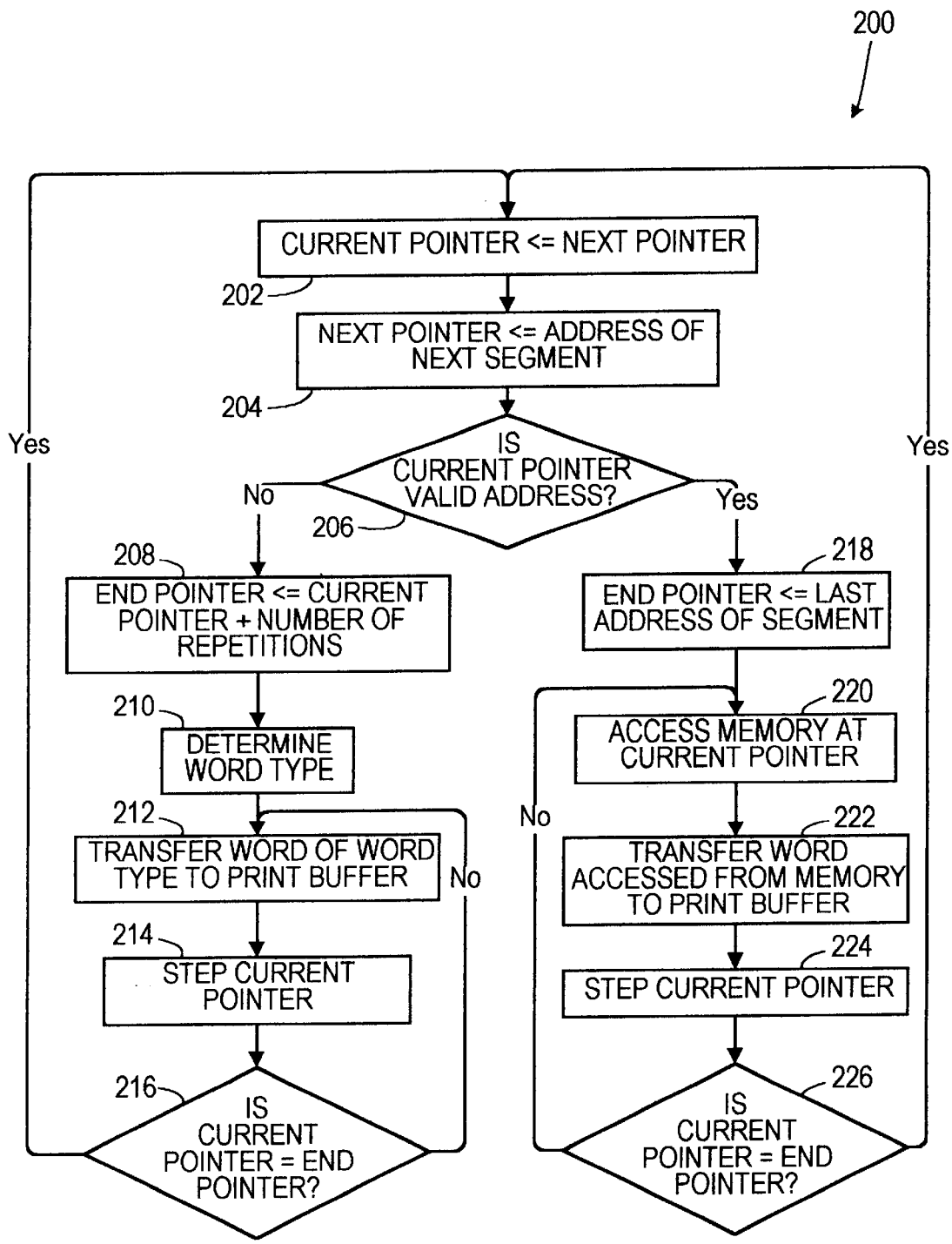
FIG. 2 is a logic diagram demonstrating a first embodiment of a method according to the invention.

As shown in FIG. 2, the logic flow 200 executed by the processor 120 involves writing zeros to the print buffer 112 whenever the value of the current address pointer 124 represents an invalid address. The transfer of a new segment begins by assigning 202 the value of the next segment pointer to the current address pointer. The next segment pointer is then assigned 204 the value of the first address of the next segment to be transferred. A test 206 is performed to determine if the current address pointer points to a valid address. If the result is "No" then the end segment pointer is assigned 208 a value equal to the value in the current segment pointer plus the number of words of the predetermined word type to be repeated. Next, the type of word to be repeated is determined 210. In simple applications, such as those in which transferring blocks of zeros to the print buffer is the only way to avoid a memory access, this step might degenerate to making the assumption that a word of zeros is the word type. In a more complicated example, the invalid address could give information as to what word type is to be transferred. For example, an address in the range of F000–FFFF could indicate that the word type is "0000000000000000," an address in the range of E000–EFFF could indicate that the word type is "1111111111111111" and an address of D000–DFFF could indicate that the word type is "1010101010101010," etc.

Once the word type is determined 210, a word of the word type is transferred 212 to the print buffer and the current address pointer is stepped 214. A test 216 is performed to determine if the entire block has been transferred by comparing the value of the current address pointer to the value of the end segment pointer. If the words in the repetitive block remain to be transferred to the print buffer, then the thread of execution returns to transfer step 212, otherwise the thread of execution returns to step 202 and the system begins transferring the next segment.

If the result of test 206 indicates that the current address pointer contains a valid address, thereby indicating that memory accesses are required, the processor sets 218 the value of the end segment pointer to the value of the address of the last word in the segment. The processor then accesses 220 the memory at the address in the current address pointer, the data word accessed is transferred 222 from the memory to the print buffer and the current address pointer is stepped 224. A test 226 is performed to determine if the entire current segment has been transferred. If the result is "No" then execution returns to step 220, otherwise execution returns to step 202 and the processor begins transferring the next segment.

There are two possible situations in which an invalid address would be in both the current address and end segment pointers as well as in the next segment pointer. The first situation arises when the invalid address range is very small and does not contain enough addresses to generate enough of the needed data pattern. The next segment pointer could be used to jump back to the beginning of the invalid address range and continue generating the data pattern. The second situation arises when there is more than one type of pattern of data to be generated by using invalid addresses. A different invalid address range is set up for each type of pattern. The processor might jump from one of these address ranges to the next. For example, when a printer that is currently printing white space (all zeros) next needs to print a solid black segment (all ones) after completing the white space printing, the processor would set the next segment pointer to the invalid address that indicates generating all ones. The current address and end segment pointers would point to invalid addresses in the range for printing all zeros.

Figure 3A:
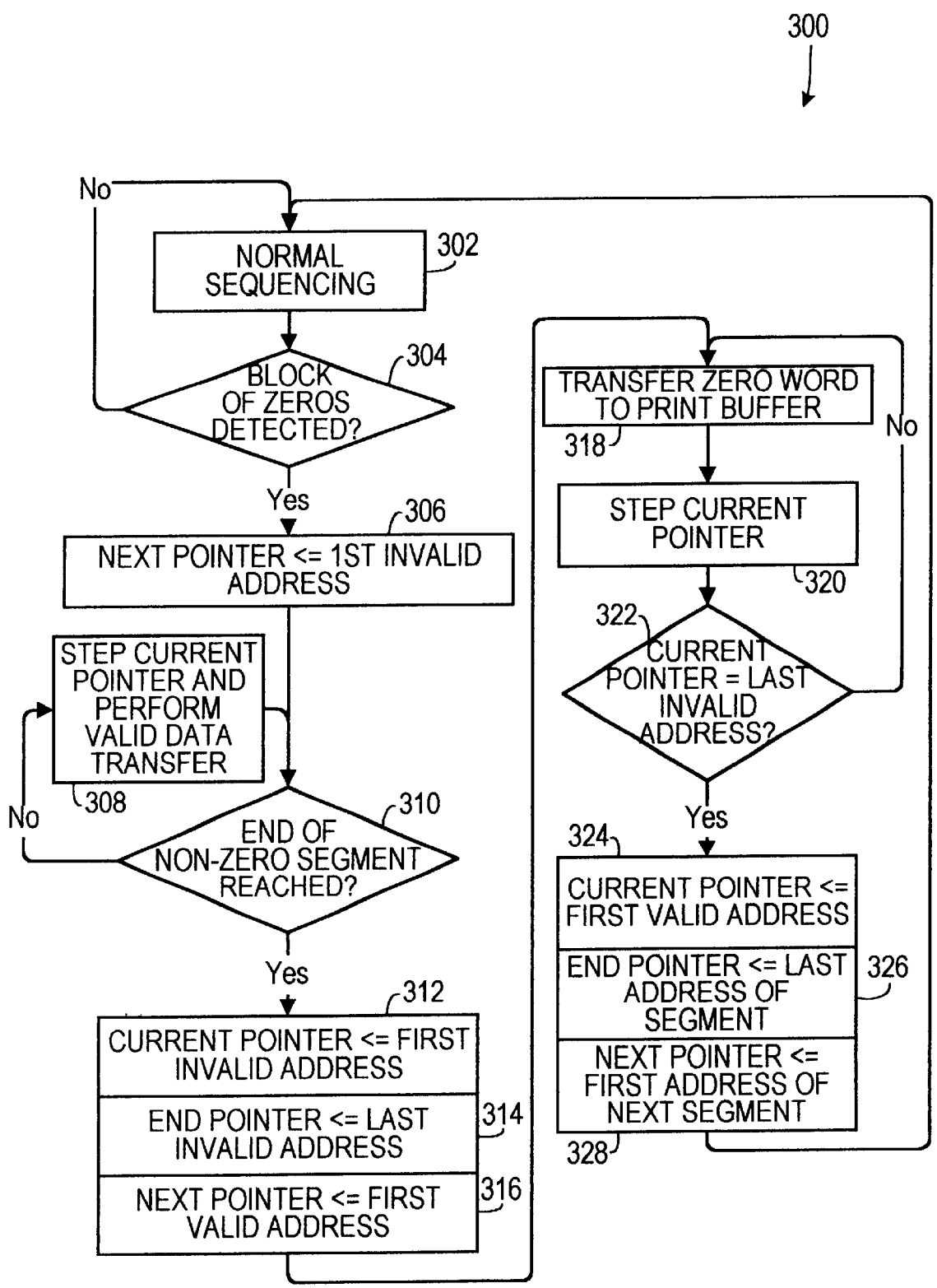
FIG. 3A is a logic diagram demonstrating a second embodiment of a method according to the invention.

Another approach to embodying the invention is shown in the logic flow diagram 300 of FIG. 3A. In this approach, the processor normally sequences 302 data until it detects 304 a block of zeros to be transferred (one illustrative embodiment of normal sequencing 302 is demonstrated in more detail in FIG. 3B). At this point, the next segment pointer is assigned 306 a first invalid address. Sequencing continues by performing a test 310 to determine if the end of the current block of data has been reached. If not, the current address pointer is stepped and a normal data transfer occurs 308.

Once the end of the current segment is reached, the current address pointer is assigned 312 the value of the first invalid address, the end segment pointer is assigned 314 the value of the last invalid address (which equals the first invalid address plus the number of zero words in the block of zeros) and the next segment pointer is assigned 316 the value of the first address of the next segment to be transferred to the print buffer. A zero word is then transferred to the print buffer 318, the current address pointer is stepped 320 and a test 322 is performed to determine if the last word of zeros of the current segment has been transferred to the print buffer. If not, execution returns to operation 318. Otherwise, the current address pointer is assigned 324 the value residing in the next segment pointer (the first address of the next segment), the end segment pointer is assigned 326 the last address of the next segment and the next segment pointer is assigned 328 the first address of the segment to be transferred after the new segment is transferred. The thread of execution then returns to block 302.

Figure 3B:
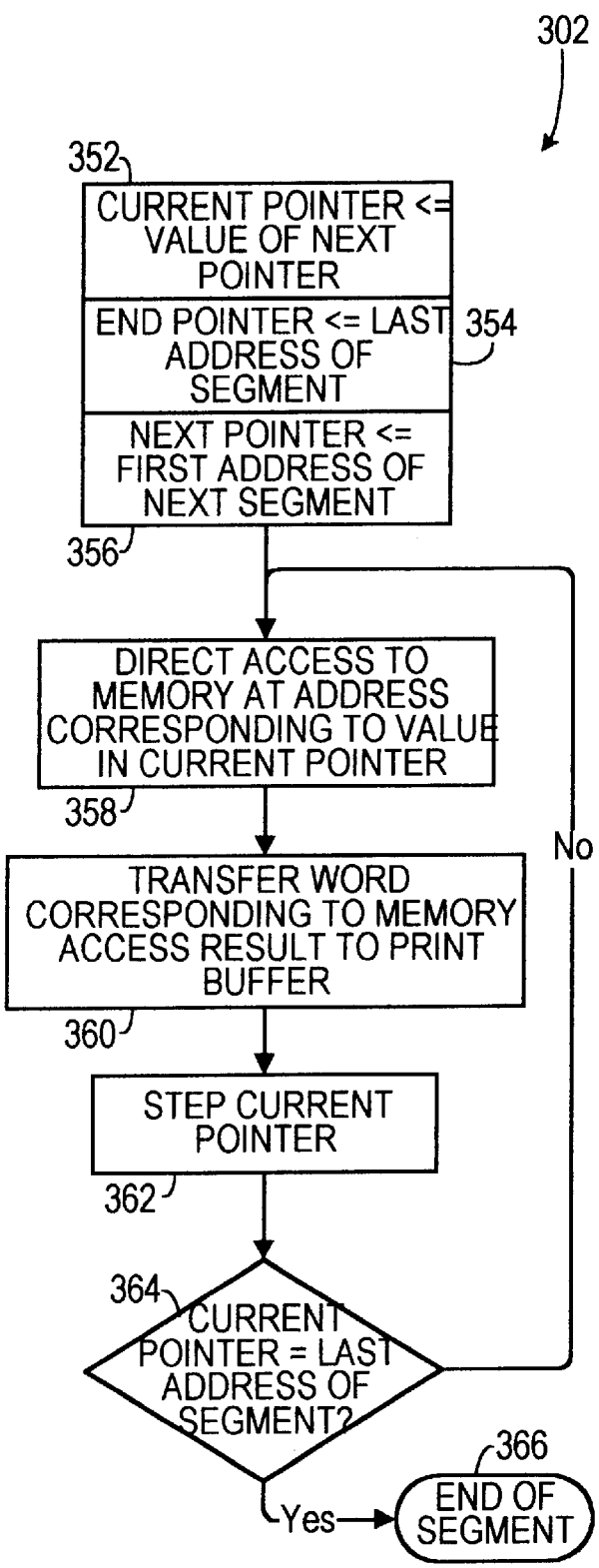
FIG. 3B is a logic diagram illustrating normal sequencing in a method according to the invention.

As shown in FIG. 3B, normal sequencing 302 involves assigning 352 the value of the first address of a segment to the current address pointer, assigning 354 the value of the last address of the segment to the end segment pointer and assigning 356 the value of the first address of the next segment to be transferred to the next segment pointer. A direct memory access is performed 358 to the address in the current address pointer, the word accessed from memory is transferred 360 to the print buffer and the current address pointer is stepped 362. A test 364 is then performed to determine if the last word of the segment has been transferred. If the result is "No," then the thread of execution returns to operation 358, otherwise the end of the segment has been reached 366.

The above disclosed embodiment describes the process employed when the invention is making the transition from normal sequencing involving direct memory access to transferring a block of zeros. It will be appreciated that in certain situations, such as when a left-most margin is to be left blank, it will be unnecessary to complete the transfer of direct memory-accessed data prior to transferring zeros to the print buffer. In such a case, it is possible to begin advancing the print head without applying ink to the paper in the margin by placing an invalid address in the current address pointer, without regard to the value of the next segment pointer.

While the above disclosed embodiment demonstrates the invention applied to a printer, it is understood that the invention could also be applied to any device that performs direct memory access (e.g., other peripherals, such as disc drives, etc.) without departing from the scope of the invention.

The above described embodiments are given as an illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A method of reducing direct memory access in a machine employing a data segmenting scheme, comprising the steps of:

a. detecting when a repetitive block of data is to be transferred, wherein the repetitive block of data repeats a data word of a predetermined value;

b. assigning a first invalid address to a current address pointer, the first invalid address indicating that the repetitive block of data is to be generated;

c. assigning a second invalid address to an end segment pointer, the second invalid address corresponding to the first invalid address plus a value indicating a number of repetitive data words that is included in the block of repetitive data; and d. while the current address pointer has a value assigned thereto that is not equal to the second invalid address, performing the following steps:
   i. generating a data word of the predetermined value; and
   ii. stepping the value assigned to the current address pointer.

2. The method of claim 1, further comprising the step of assigning a valid address to a next segment pointer, the valid address indicating an address in a memory space to which the machine is to perform a direct memory access after the value assigned to the current address pointer is not less than the second invalid address.

3. The method of claim 1, wherein the detecting step comprises the step of comparing each data word of a predetermined amount of a machine-readable memory to the predetermined value.

4. The method of claim 1, wherein the predetermined value consists of a plurality of zeros.

5. The method of claim 1, wherein the predetermined value consists of a plurality of ones.

6. The method of claim 1, wherein the predetermined value comprises a pattern of data.

7. The method of claim 1, wherein the first invalid address comprises data that indicates a selection of the predetermined data value.

8. A method of reducing direct memory access in a machine employing a data segmenting scheme, comprising the steps of:

a. detecting when a repetitive block of data is to be transferred, wherein the repetitive block of data repeats a data word of a predetermined value for a predetermined number of repetitions;

b. if a repetitive block of data is to be transferred,
   then assigning a first invalid address to a next segment pointer, the first invalid address indicating that the repetitive block of data is to be generated after a transfer of a first data segment is complete,
   otherwise assigning a first memory address of a second data segment to the next segment pointer;

c. when transfer of the first data segment is complete, assigning to a current address pointer a value currently assigned to the next segment pointer;

d. while the value assigned to the current address pointer corresponds to a valid memory address, performing the following steps:
   i. assigning to an end segment pointer a value corresponding to a last memory address of a second data segment; and
   ii. while the value assigned to the current address pointer is not equal to the value assigned to the end segment pointer, performing the following steps:
      A. accessing a memory location addressed at the value assigned to the current address pointer;
      B. fetching a data word stored in the memory location; and
      C. stepping the value assigned to the current address pointer; and e. while the value assigned to the current address pointer corresponds to an invalid memory address, performing the following steps:
   i. assigning to an end segment pointer a value corresponding to the value assigned to the current address pointer plus a value corresponding to the predetermined number of repetitions; and
   ii. while the value assigned to the current address pointer is not equal to the value assigned to the end segment pointer, performing the following steps:
      A. generating a data word of a predetermined type; and
      B. stepping the value assigned to the current address pointer.

9. The method of claim 8, wherein the predetermined type of data word comprises a data word consisting of a plurality of zeros.

10. The method of claim 8, wherein the predetermined type of data word comprises a data word consisting of a plurality of ones.

11. The method of claim 8, wherein the predetermined type of data word comprises a sequence of ones and zeros, the method further comprising the step of determining the type of data word by selecting for a group of sequences based on an invalid memory address value assigned to the next segment pointer.

12. The method of claim 8, wherein the stepping step comprises incrementing the value assigned to the current address pointer.

13. The method of claim 8, wherein the stepping step comprises decrementing the value assigned to the current address pointer.

14. A printer, comprising:

a. a printer controller that includes a digital control circuit programmed to execute the following operations:
   i. detect when a repetitive block of data is to be printed, wherein the repetitive block of data repeats a data word of a predetermined value;
   ii. assign a first invalid address to a next segment pointer, the first invalid address indicating that the repetitive block of data is to be generated after a transfer of a current segment is complete;
   iii. assign a second invalid address to an end segment pointer, the second invalid address corresponding to the first invalid address plus a value indicating a number of repetitive data words that is included in the block of repetitive data;
   iv. assign the first invalid address to a current address pointer; and
   v. while the current address pointer has a value assigned thereto that is not equal to the second invalid address, performing the following steps:
      A. generate a data word of the predetermined value; and
      B. step the value assigned to the current pointer; and b. a printer mechanism that receives the data word of the predetermined value from the printer controller and that executes a print operation corresponding to the data word of predetermined value.

15. The printer of claim 14, wherein the print mechanism comprises a print head.

16. The printer of claim 15, wherein the print operation comprises an advance of the print head in which ink is not applied to a material being printed upon.

17. An apparatus for reducing direct memory access in a machine employing a data segmenting scheme, comprising:

a. means for detecting a repetitive block of data that is to be transferred, wherein the repetitive block of data repeats a data word of a predetermined value;

b. means for assigning a first invalid address to a first pointer, the first invalid address indicating that the repetitive block of data is to be generated after a transfer of a current segment is complete;

c. means for assigning a second invalid address to a second pointer, the second invalid address corresponding to the first invalid address plus a value indicating a number of repetitive data words that is included in the block of repetitive data;

d. means for assigning the first invalid address to a third pointer;

e. means for generating a data word of the predetermined value while the third pointer has a value assigned that is less than the second invalid address; and f. means for stepping the value assigned to the third pointer while the third pointer has a value assigned that is less than the second invalid address.

* * * * *